United States Patent [19]
Wallace et al.

[11] Patent Number: 6,052,298
[45] Date of Patent: Apr. 18, 2000

[54] INVERTER INPUT NOISE SUPPRESSION CIRCUIT

[75] Inventors: Kenneth Andrew Wallace, Lewis Center; Gueorgui I. Mantov, Lexington, both of Ohio

[73] Assignee: Peco II, Inc., Galion, Ohio

[21] Appl. No.: 09/261,783

[22] Filed: Mar. 3, 1999

[51] Int. Cl.[7] .................................................. H02M 3/24
[52] U.S. Cl. ............................................................ 363/95
[58] Field of Search ................................ 363/40, 41, 95, 363/97, 131

[56] References Cited

U.S. PATENT DOCUMENTS

| | | | |
|---|---|---|---|
| 3,638,096 | 1/1972 | Judd et al. | 321/19 |
| 3,984,799 | 10/1976 | Fletcher et al. | 321/2 |
| 4,633,163 | 12/1986 | Dillon | 323/277 |
| 5,023,541 | 6/1991 | Yosinski | 323/275 |
| 5,060,131 | 10/1991 | Sikora | 363/97 |
| 5,077,652 | 12/1991 | Faley | 363/97 |
| 5,097,198 | 3/1992 | Holmdahl | 323/280 |
| 5,140,513 | 8/1992 | Yokoyama | 363/26 |
| 5,327,335 | 7/1994 | Maddali et al. | 363/39 |
| 5,442,534 | 8/1995 | Cuk et al. | 363/16 |
| 5,490,055 | 2/1996 | Boylan et al. | 363/41 |
| 5,668,713 | 9/1997 | Eguchi et al. | 363/95 |
| 5,872,710 | 2/1999 | Kameyama | 363/95 |
| 5,914,866 | 6/1999 | Eguchi et al. | 363/40 |

FOREIGN PATENT DOCUMENTS

| | | | |
|---|---|---|---|
| 920-677 | 4/1980 | U.S.S.R. | 363/95 |

*Primary Examiner*—Matthew Nguyen
*Attorney, Agent, or Firm*—Marshall, O'Toole, Gerstein, Murray & Borun

[57] ABSTRACT

A noise suppression circuit for use with a DC/DC converter having an output and an input responsive at least in part to the output of the converter is provided. The noise suppression circuit includes multiple parallel feedback loops, wherein the first feedback sets the steady state nominal output voltage, the second feedback loop prevents the output voltage from exceeding a predefined high voltage level, and the third feedback loop prevents the output voltage from decreasing below a predefined low voltage level. In some embodiments, the first, second, and third feedback loops comprise a operational amplifier, a diode, and an internal feedback loop, wherein the internal feedback loops of each of these loops share a common node. The common node configuration provides the circuit with quick transitions between output voltage states and dynamic regulation of the DC/DC converter output voltage.

9 Claims, 5 Drawing Sheets

INVERTER INPUT NOISE SUPPRESSION CIRCUIT

FIELD OF THE INVENTION

The present invention relates generally to DC/DC converters, and, more particularly, to an inverter input noise suppression circuit for use with a DC/DC converter supplying an inverter with DC power.

BACKGROUND OF THE INVENTION

Numerous electrical systems demand both DC power and AC power of high availability to run different electrical components. For example, telecommunications systems which require DC power for most electrical components, also require AC power for monitoring and controlling components. For systems like those in the telecommunications area in which both the DC powered and the AC powered electrical equipment are sensitive to voltage fluctuations and faults, and in which an existing DC power source is used, an inverter is often used to create AC power from the existing DC power source. Such an inverter system operating off an existing battery source in Telecom or similar offices is more cost effective than using a separate power source or separate source battery.

In conventional systems such as those described above, the inverter input current received which the DC/DC converter draws from the source is not constant. Instead, the input current has a ripple current on top of the DC current. This ripple current, which, for example, may take the form of 120 Hz ripples on the DC current results from the operation of the inverter circuit block. Specifically, the power train of the inverter creates this ripple effect by drawing a slightly sinusoidal DC current from the DC/DC converter. This ripple effect on the DC output current from the DC/DC converter constitutes input noise to the DC voltage source.

In addition, inverters and the downstream circuits which they power are often sensitive to sharp fluctuations in driving voltage. For example, upon turn-on of downstream components the inverter circuit may see a sharp load increase. The resultant effect on the output DC voltage from the DC/DC converter is a sharp decrease in the output voltage and, therefore, a sharp decrease in input voltage to the inverter. The opposite effect can occur with sharp decreases in the load. In either situation, the sharp voltage fluctuation is detrimental to inverter operation and the driving of downstream circuits.

SUMMARY OF THE INVENTION

In accordance with an aspect of the present invention, a circuit is provided for use with a DC/DC converter. The circuit includes a first feedback loop coupled between the output and the input of the converter. The first feedback loop has a first response time and is operable to substantially maintain the output voltage of the converter at a first predefined level under steady state conditions. The circuit also includes a second feedback loop coupled between the output and the input of the converter in parallel with the first feedback loop. The second feedback loop has a second response time which is faster than the first response time. The second feedback loop is responsive to changes in the output voltage to substantially limit the output voltage to a second predefined level higher than the first predefined level. The first feedback loop operates concurrently with the second feedback loop to return the output voltage to the first predefined level after expiration of the first response time. The circuit also includes a third feedback loop coupled between the output and the input of the converter in parallel with the first and second feedback loops. The third feedback loop has a third response time which is faster than the first response time, and is responsive to changes in the output voltage to substantially limit the output voltage from decreasing below a third predefined level lower than the first predefined level. The first feedback loop operates concurrently with the third feedback loop to return the output voltage to the first predefined level after expiration of the first response time.

In some embodiments of the present invention, the second response time is substantially the same as the third response time. In other embodiments of the present invention, the second response time is different than the third response time.

In some embodiments of the present invention, the first feedback loop comprises a first operational amplifier, a first diode and a first internal feedback loop having a first impedance; the second feedback loop comprises a second operational amplifier, a second diode and a second internal feedback loop having a second impedance; and the third feedback loop comprises a third operational amplifier, a third diode and a third internal feedback loop having a third impedance. In such embodiments, the first and second diodes preferably share a common node. In some such embodiments, the first, second, and third internal feedback loops share a voltage follower. In some embodiments, the first impedance is substantially capacitive and the second and third impedances are substantially resistive.

In some embodiments, the circuit further includes a diode located to isolate the first and second operational amplifiers from a voltage output of the third operational amplifier.

In any of the foregoing embodiments, the circuit may be provided with a first voltage divider network coupled between the output of the converter and the input of the first operational amplifier, a second voltage divider network coupled between the output of the converter and the input of the second operational amplifier, and a third voltage divider network coupled between the output of the converter and the input of the third operational amplifier.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
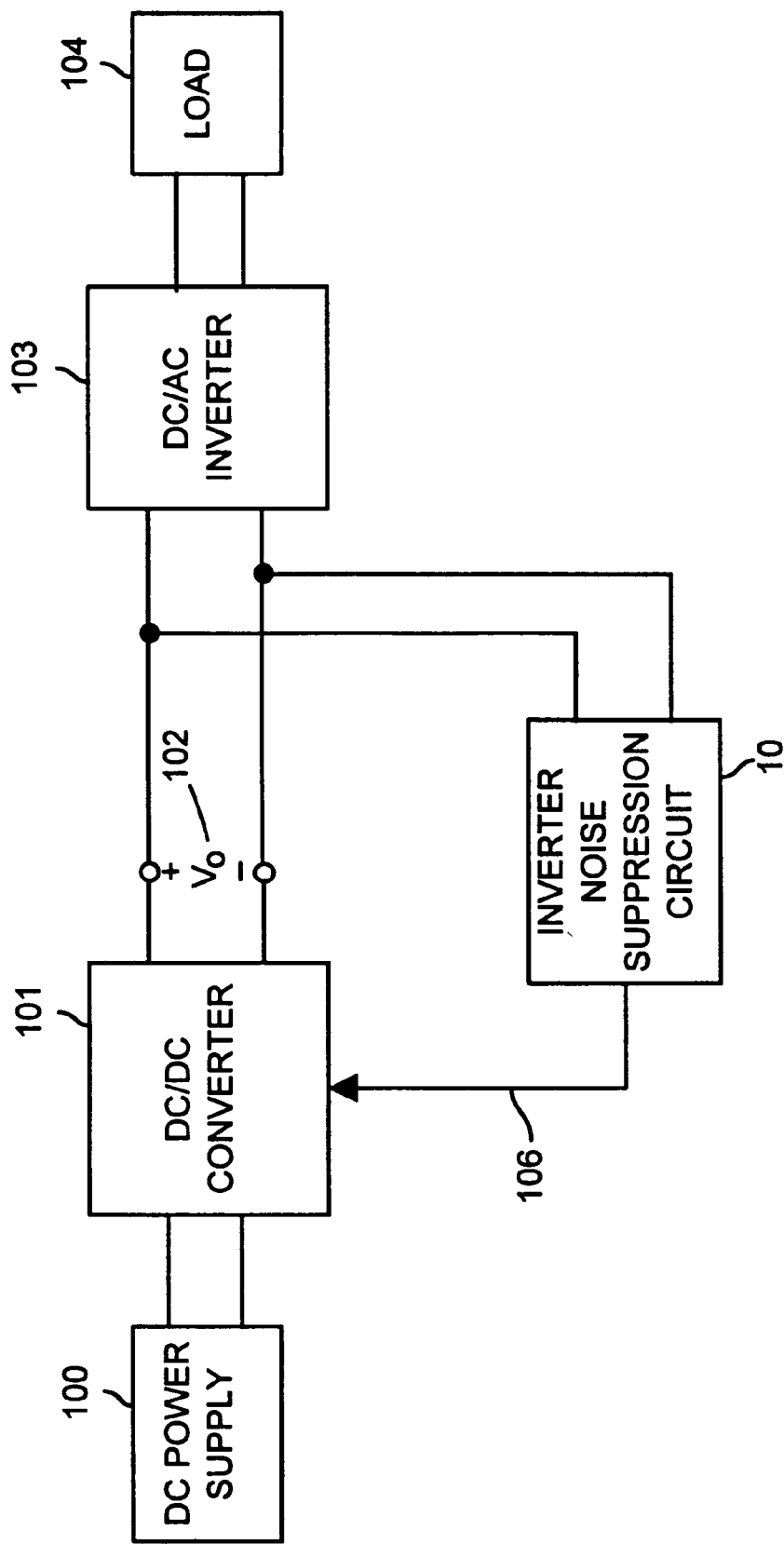
FIG. 1 is a block diagram of an inverter input noise suppression circuit constructed in accordance with the teachings of the invention and shown in an exemplary environment of use.

An inverter noise suppression circuit 10 constructed in accordance with the teachings of the invention is shown in a preferred environment of use in FIG. 1. Although the inverter noise suppression circuit is particularly well suited for telecommunications applications in which a DC power source already exists, persons of ordinary skill in the art will readily appreciate that the teachings of the instant invention are not limited to any particular environment of use. On the contrary, the teachings can be used in any environment which would benefit from the enhanced noise suppression they achieve.

In the environment shown in FIG. 1, a DC power source 100 and a DC/DC converter 101 are provided. As is conventional, the DC/DC converter 101 operates to convert the DC voltage supplied by the source 100. The converted DC voltage is supplied to a DC/AC inverter 103, which converts it into AC voltage. The AC power output by the inverter 103 is delivered to a load 104 which, as will be appreciated by persons of ordinary skill in the art, may actually constitute multiple loads.

As will be further appreciated by persons of ordinary skill in the art, the converter 101 may be implemented by either a step-up or step-down converter of conventional design depending upon user preference. The converter 101 is chosen to transform the input voltage received from the source 100 into an output voltage desirable for use in the downstream circuits constituting the load 104.

Figure 2:
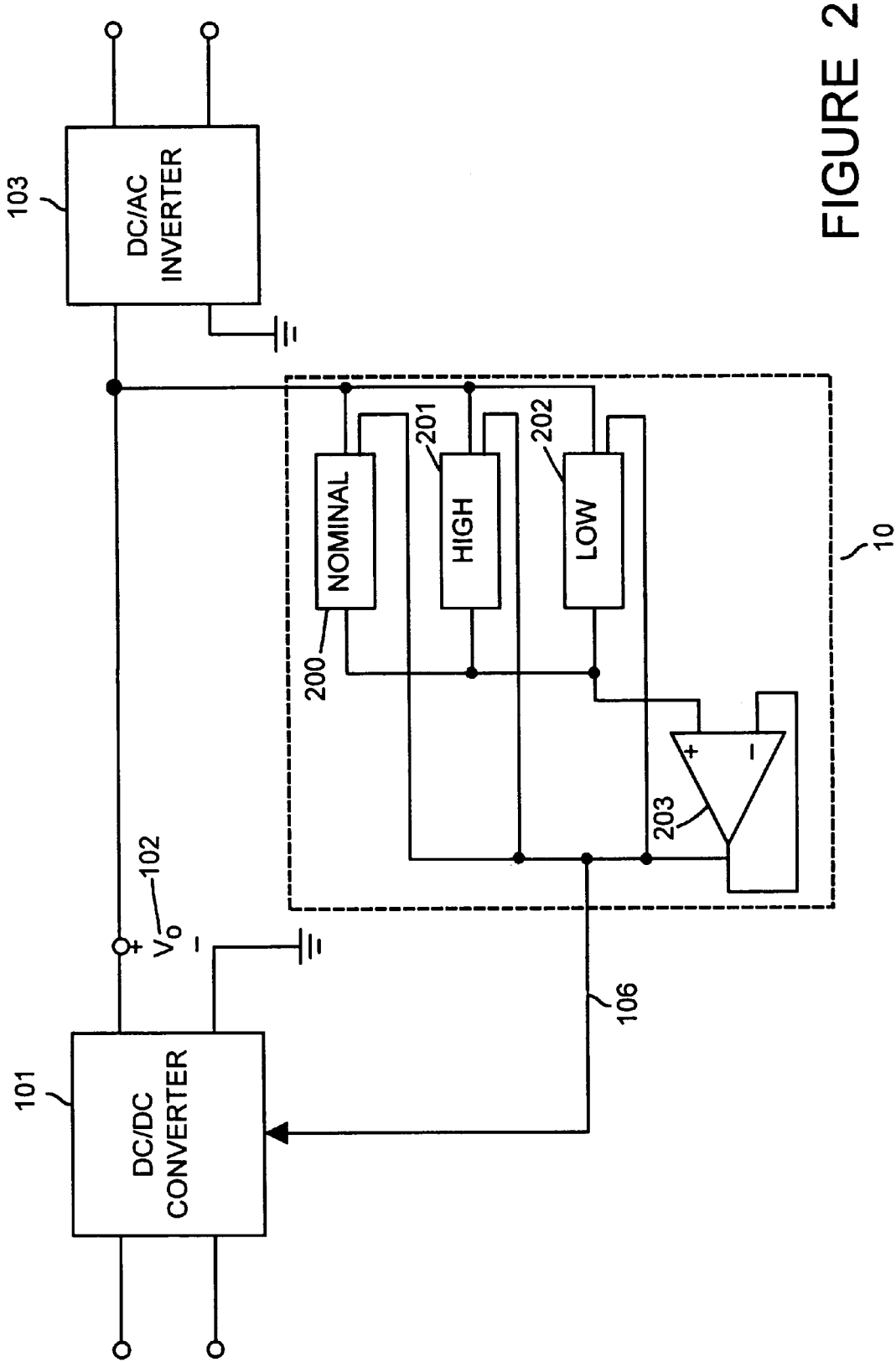
FIG. 2 is a more detailed block diagram of the noise suppression circuit of FIG. 1.

For the purpose of establishing a low level inverter input ripple current and good dynamic regulation of the DC converter output voltage supplied to the inverter 103, the inverter input noise suppression circuit 10 is coupled in a feedback loop associated with the converter 101. The noise suppression circuit 10 provides a feedback signal to converter 101 via error signal connection 106. A more detailed block diagram of the inverter input noise suppression circuit 10 is shown in FIG.2.

To establish a steady state converter output voltage, the noise suppression circuit 10 is provided with a first (nominal) feedback loop 200 with a first response time. The response time of the first feedback loop 200 is chosen to be slow enough to produce low level ripple current on the DC current supplied from the source 100 to the converter 101. The first feedback loop 200 is always in operation to maintain the output voltage 102 at a predetermined nominal steady state value.

Figure 3:
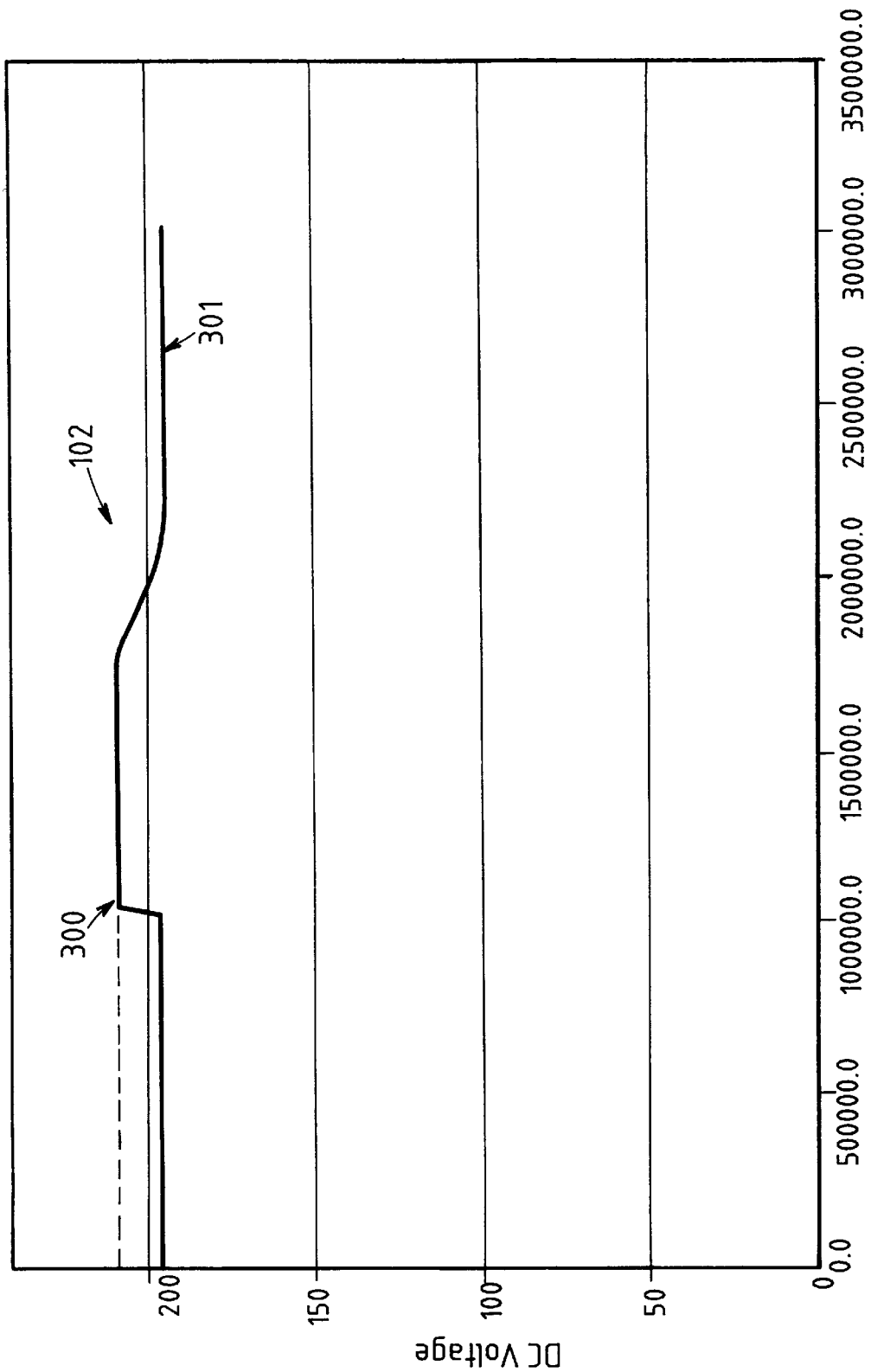
FIG. 3 is a graph illustrating an example response to a sharp load decrease by a DC/DC converter serviced by the noise suppression circuit of FIG. 1.
Figure 4:
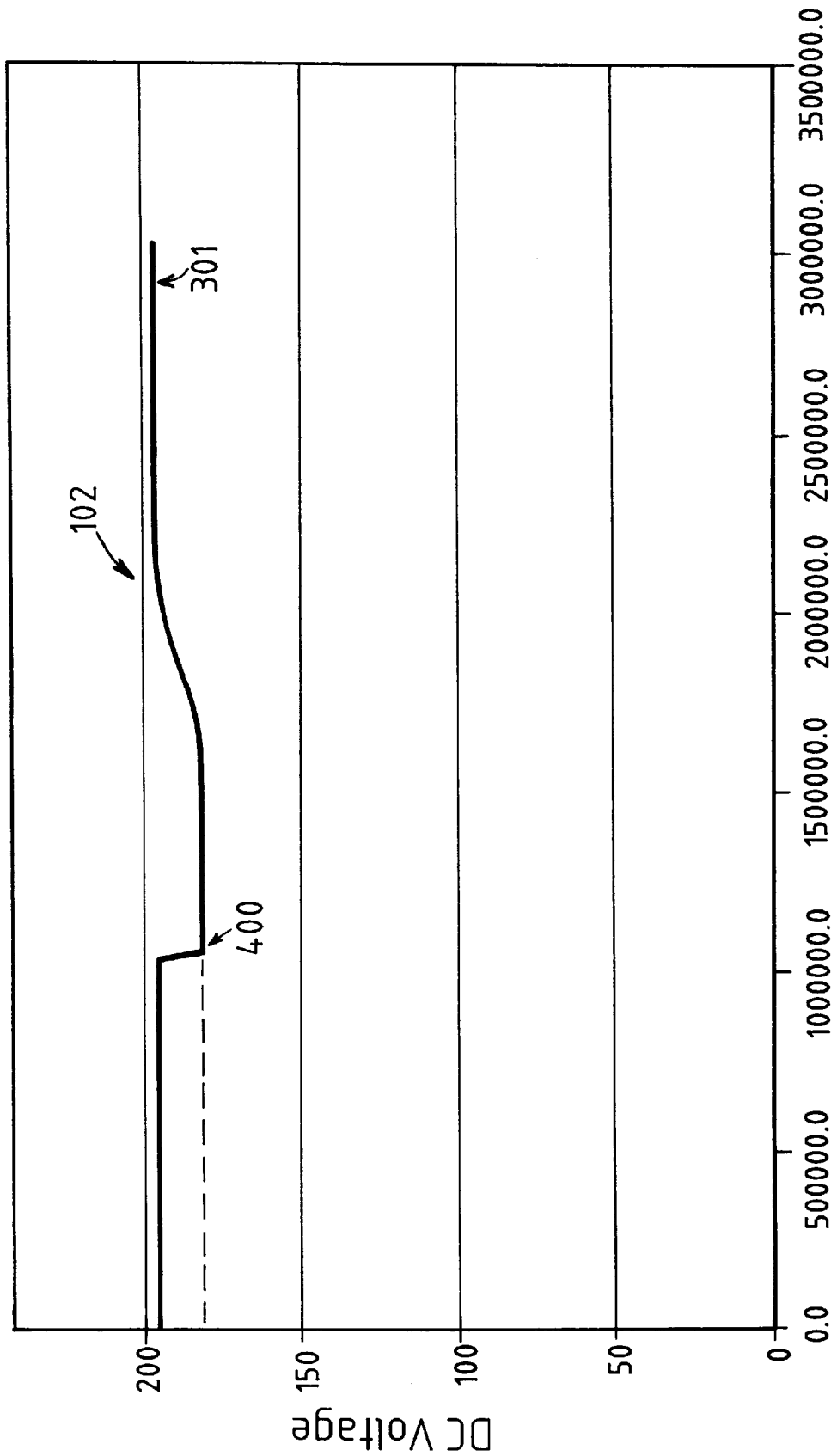
FIG. 4 is a graph illustrating an example response to a sharp load increase by a DC/DC converter serviced by the noise suppression circuit of FIG. 1.

To regulate sharp fluctuations in the output voltage 102 in response to increases or decreases in the current to the load 104, a second (high) feedback loop 201 and a third (low) feedback 202 are included in the noise suppression circuit 10. The second feedback loop 201 is coupled in parallel with the first feedback loop 200 and operates concurrently with the first feedback loop 200 in response to sharp increases in the output voltage 102 of the converter 101. In particular, the second feedback loop 201 produces an error signal, via error signal connection 106, which clips output voltage 102 at a predetermined output voltage value 300 as shown in FIG. 3. The third feedback 202 is also coupled in parallel with the first feedback loop 200 and operates concurrently with the first feedback loop 200 in response to sharp decreases in the output voltage 102 of the converter 101. The third feedback loop 202 produces an error signal, via error signal connection 106, which clips the output voltage 102 of the converter 101 at a predetermined output voltage value 400 as shown in FIG. 4. The error signal along error signal connection 106 is received from the output of a buffer 203. The buffer 203 is placed within the internal feedback loops of the first feedback loop 200, the second feedback loop 201, and the third feedback loop 203. The buffer 203 isolates the internal feedback loops from the output of the first feedback loop 200, the second feedback loop 201, and the third feedback loops 203, respectively. One side of each of these three feedback loops are connected to the same node of buffer 203. The output of the buffer 203 is connected to each of the internal feedback loops and to error signal connection 106.

An example response of the output voltage 102 of the converter 101 to a sharp drop in the load 104 as a function of time is shown in FIG. 3. As shown in that figure, a sharp increase in output voltage 102, which may result from a drop in the load 104, will be capped in a very short response time. The high voltage value 300 at which output voltage 102 is capped may be predetermined by the adjustment of the parameters of the second feedback loop 201. During operation of the second feedback loop 201 the first feedback loop 200, which has a slower response time, concurrently operates to return the capped output voltage 102 to a predetermined nominal output voltage level 301. The nominal output voltage level 301 is determined by adjustment of the parameters of the first feedback loop 200.

An example response of the output voltage 102 of the converter 101 to a sharp increase in the load 104 as a function of time is shown in FIG. 4. As shown in that figure, a sharp decrease in output voltage 102, which may result from an increase in the load 104, will be capped in a very short response time. The low voltage value 400 at which the output voltage 102 is capped may be predetermined by the adjustment of the parameters of third feedback loop 202. During operation of the third feedback loop 202, the first feedback loop 200, which has a slower response time, concurrently operates to return the capped output voltage 102 to a predetermined nominal output voltage level 301.

Figure 5:
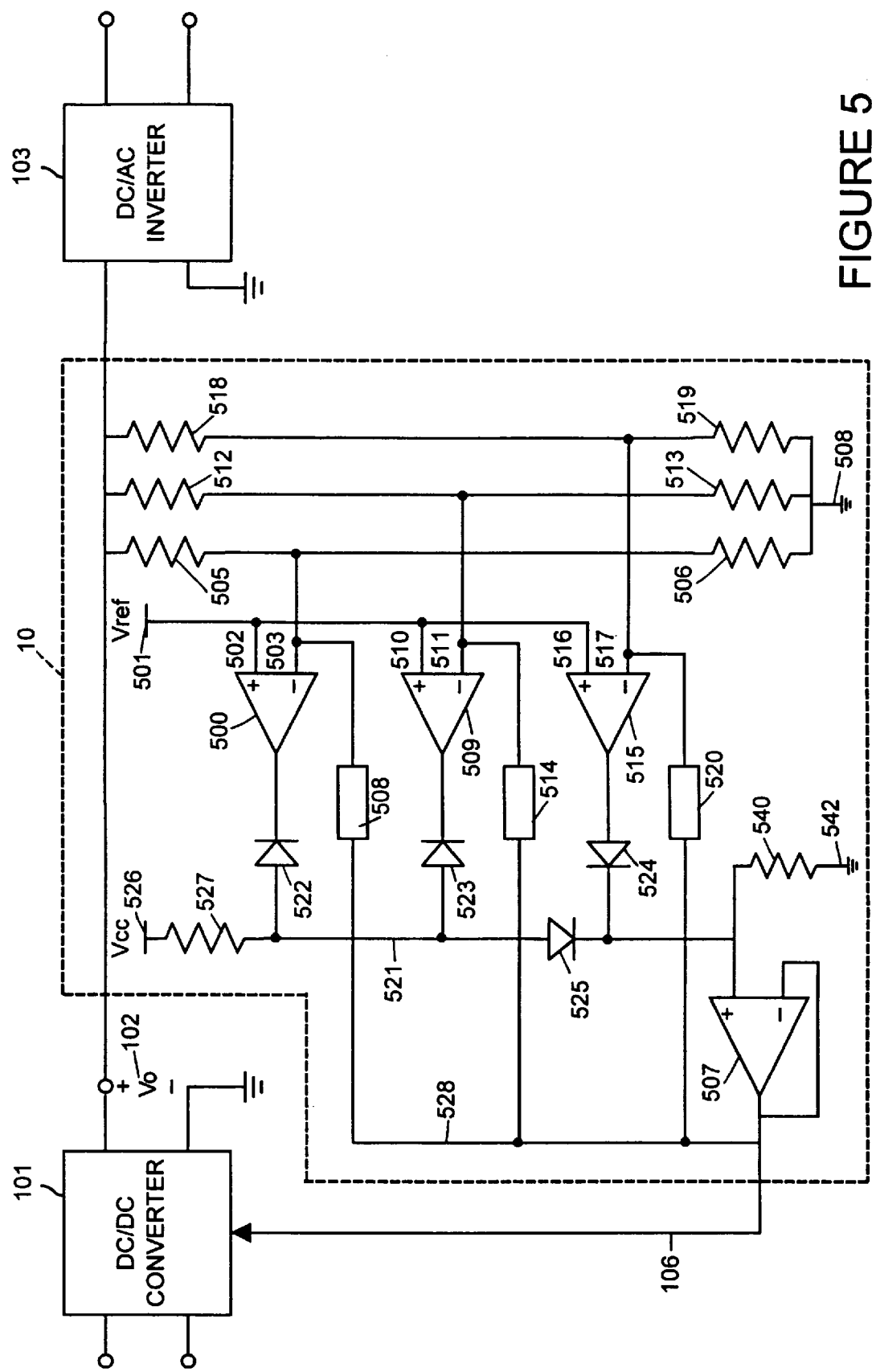
FIG. 5 is a schematic diagram of an exemplary noise suppression circuit constructed in accordance with the teachings of the invention.

A schematic diagram of an exemplary noise suppression circuit 10 is shown in FIG. 5. As discussed above, there are three feedback loops 200, 201, 202 within the noise suppression circuit 10. For the purpose of establishing the nominal output voltage of the converter 101, the first feedback loop 200 is provided with an operational amplifier 500. To compare the output voltage 102 to a predetermined output voltage, the non-inverting input 502 of the operational amplifier 500 is coupled to a reference voltage source 501 and the inverting input 503 of the op-amp 500 is coupled to a first voltage divider. The voltage divider includes resistor 505 and resistor 506, and functions to drop the output voltage of the converter 101 to a lower voltage level on the order of magnitude of the reference voltage supplied by the source 501. Resistor 505 is coupled across output voltage 102 and inverting input 503, and the resistor 506 is connected across the inverting input 503 and ground 508. The resistance values of the resistors 505, 506 are chosen such that, under normal steady state operating conditions, the input voltage at the inverting input 503 is approximately equal to the value of the reference voltage from the supply 501. As will be appreciated by persons of ordinary skill in the art, the feedback path of the first feedback loop 200 is connected in such a way that it includes the operational amplifier 507, which in a preferred embodiment is set up as a voltage follower. The non-inverting input of operational amplifier 507 is connected to a pull-down resistor 540 which is connected to a ground 542. The pull-down resistor 540 has a high resistance value because of the high input impedance of the operational amplifier 507.

To establish the time constant for the first feedback loop 200, the feedback path from the output of the operational amplifier 507 to the inverting input 503 of operational amplifier 500 contains an impedance element 508. To ensure that the first feedback loop 200 has a slow time response in comparison to the second feedback 201 and the third feedback loop 202, impedance 508 is preferably chosen to be capacitive. The first feedback loop 200 having a slow time response makes the current drawn from the source by the converter 101 change very slowly. This ensures a low level ripple current on the DC/DC converter input. In the preferred embodiment, the impedance 508 is implemented by a capacitor, but persons of ordinary skill in the art will readily appreciate that any combination of resistors and capacitors may be used.

For the purpose of establishing a high threshold capped voltage, the second feedback loop 201 comprises an operational amplifier 509. To compare the output voltage 102 to a predetermined output voltage, the non-inverting input 510 of the operational amplifier 509 is coupled to a reference voltage source 501 and the inverting input 511 of the operational amplifier 509 is coupled to a second voltage divider. The second voltage divider includes resistor 512 and resistor 513, and functions to drop the output voltage of the converter 101 to a lower voltage level on the order of magnitude of the reference voltage supplied by the source 501. Resistor 512 is coupled across output voltage 102 and inverting input 511, and the resistor 513 is connected across the inverting input 511 and ground 508. The resistance values of the resistors 512, 513 are chosen such that, under normal steady state operating conditions, the input voltage at the inverting input 511 is less than the value of the reference voltage from the source 501. As will be appreciated by persons of ordinary skill in the art, the feedback path of the second feedback loop 201 is connected through operational amplifier 507, which in a preferred embodiment is set up as a voltage follower.

To establish the time constant for the second feedback loop 201, the feedback path from the output of the operational amplifier 507 to the inverting input 511 of operational amplifier 509 contains an impedance element 514. To ensure that the second feedback loop 201 has a fast time response in comparison to the first feedback 200, impedance 514 is preferably chosen to be substantially resistive. The second feedback loop 201 turns on in response to sharp increases in the output voltage 102, and the fast time response of the second feedback loop 201 ensures that the output voltage 102 from converter 101 is capped at a predetermined high voltage threshold 300 in a relatively short period of time.

For the purpose of establishing a low threshold capped voltage, the third feedback loop 202 comprises an operational amplifier 515. To compare the output voltage 102 to a predetermined output voltage, the non-inverting input 516 of the operational amplifier 515 is coupled to the reference voltage source 501 and the inverting input 517 of operational amplifier 515 is coupled to a third voltage divider. The third voltage divider includes resistor 518 and resistor 519, and functions to drop the output voltage of the converter 101 to a lower voltage level on the order of magnitude of the reference voltage supplied by the source 501. Resistor 518 is coupled across output voltage 102 and inverting input 517, and the resistor 519 is connected across the inverting input 517 and ground 508. The resistance values of the resistors 518, 519 are chosen such that under normal steady state operating conditions, the input voltage at the inverting input 517 is greater than the value of the reference voltage from the supply 501. As will be appreciated by persons of ordinary skill in the art, the feedback path of the third feedback loop 202 is connected through operational amplifier 507, which in a preferred embodiment is set up as a voltage follower.

To establish the time constant for the third feedback loop 202, the feedback path from the output of the operational amplifier 507 to the inverting input 517 of operational amplifier 515 contains an impedance element 520. To ensure that the third feedback loop 202 has a fast time response in comparison to the first feedback 200, impedance 520 is preferably chosen to be substantially resistive. The third feedback loop 202 turns on in response to sharp decreases in the output voltage 102, and the fast time response of the third feedback loop 202 ensures that the output voltage 102 from converter 101 is capped at a predetermined low voltage threshold 400 in a short period of time.

To provide an error signal to the converter 101 representing the difference between the output voltage 102 and a predetermined output voltage, the output of operational amplifier 507 is input to the converter via error signal connection 106. As will be appreciated by those skilled in the art, the error signal may be used by the converter 101 to adjust the pulse-width modulation of the duty cycle therein, which in turn determines the output current and output voltage 102 delivered by the converter 101.

For the purpose of establishing concurrent operation of the first feedback loop 200, the second feedback loop 201, and the third feedback loop 202, the outputs from operational amplifier 500, operational amplifier 509, and operational amplifier 515 are connected in parallel. To ensure that the first feedback loop 200 is always turned-on and producing an error signal from the output of operation amplifier 507, a first diode 522 is connected between the output of operational amplifier 500 and common node 521. Moreover, to ensure that the second feedback loop 201 turns-on during a sharp overshoot of the output voltage and controls the error signal from the operation amplifier 507, a second diode 523 is connected between the output of operational amplifier 509 and common node 521. Similarly, to ensure that the third feedback loop 202 turns-on during a sharp undershoot of the output voltage and controls the error signal from the operational amplifier 507, a third diode 524 is connected to the output of operational amplifier 515. As the low voltage threshold feedback loop, the output voltage from the operational amplifier 515 under normal operating conditions will be close to 0 volts. Therefore, the third diode 524 is reversed biased from first diode 522 and second diode 523 with the anode connected to the output of operational amplifier 515. To isolate the output voltage of the operational amplifier 515 from operational amplifier 500 and operational amplifier 509 when the output of op-amp 515 is higher than both of the outputs of op-amps 500 or 509, an isolation diode 525 is placed between the third diode 524 and the common node 521. The voltage Vcc 526 is connected to common node 521 through a pull-up resistor 527. As will be appreciated by persons of ordinary skill in the art, the output from the operational amplifiers of the feedback loops range from 0 volts, i.e. ground, to a maximum of Vcc volts.

To provide for faster and smoother transitions from one operating state to another, for example from steady state to a sharp increase in output voltage, the impedance 508, impedance 514, and impedance 520 all share a common node 528. Common node 528 operates to apply the same voltage to each impedance, and therefore establishes that the respective capacitances of impedance 508, impedance 514, and impedance 520, if any, will be charged with approximately the same voltage. This makes transitions from one operating state to another faster with smaller charging (discharging) time delays and avoids voltage overshoots.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed is:

1. For use with a converter having an output and an input, the converter consuming an input current responsive at least in part to the output current of the converter, a circuit comprising:

a first feedback loop coupled between the output and the input of the converter, the first feedback loop having a first response time and being operable to substantially maintain the output voltage of the converter at a first predefined level under steady state conditions;

a second feedback loop coupled between the output and the input of the converter in parallel with the first feedback loop, the second feedback loop having a second response time which is faster than the first response time, the second feedback loop being responsive to changes in the output voltage to substantially limit the output voltage to a second predefined level higher than the first predefined level, wherein the first feedback loop operates concurrently with the second feedback loop to return the output voltage to the first predefined level after expiration of the first response time; and a third feedback loop coupled between the output and the input of the converter in parallel with the first and second feedback loops, the third feedback loop having a third response time which is faster than the first response time, the third feedback loop being responsive to changes in the output voltage to substantially limit the output voltage from decreasing below a third predefined level lower than the first predefined level, wherein the first feedback loop operates concurrently with the third feedback loop to return the output voltage to the first predefined level after expiration of the first response time.

2. A circuit as defined in claim 1 wherein the second response time is substantially the same as the third response time.

3. A circuit as defined in claim 1 wherein the second response time is different than the third response time.

4. A circuit as defined in claim 1 wherein the first feedback loop comprises a first operational amplifier, a first diode and a first internal feedback loop having a first impedance; the second feedback loop comprises a second operational amplifier, a second diode and a second internal feedback loop having a second impedance; and the third feedback loop comprises a third operational amplifier, a third diode and a third internal feedback loop having a third impedance, wherein the first diode and the second diode share a common output node.

5. A circuit as defined in claim 4 wherein the first internal feedback loop, the second internal feedback loop, and the third internal feedback loop are all connected to a common output node.

6. A circuit as defined in claim 4 wherein the first, second and third internal feedback loops share a voltage follower.

7. A circuit as defined in claim 4 wherein the first impedance is substantially capacitive, and the second and third impedances are resistive.

8. A circuit as defined in claim 4 further comprising a diode located to isolate the first and second operational amplifiers from a voltage output of the third operational amplifier.

9. A circuit as defined in claim 4 further comprising:

a first voltage divider network coupled to sense the output of the converter, a node of the first voltage divider network being connected to an input of the first operational amplifier;

a second voltage divider network coupled to sense the output of the converter, a node of the second voltage divider network being connected to an input of the second operational amplifier; and a third voltage divider network coupled to sense the output of the converter, a node of the third voltage divider network being connected to an input of the third operational amplifier.

* * * * *